United States Patent
Maurer et al.

(10) Patent No.: US 6,671,409 B1
(45) Date of Patent: Dec. 30, 2003

(54) BLOCKINESS PERIOD DETECTION OF DCT-BASED CODECS

(75) Inventors: Steven D. Maurer, Aloha, OR (US); Bozidar Janko, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/518,430

(22) Filed: Mar. 3, 2000

(51) Int. Cl.[7] .................................................. G06K 9/36
(52) U.S. Cl. ..................... 382/232; 382/168; 348/180; 375/240.24
(58) Field of Search ................... 382/232, 239, 382/233, 235, 199, 168; 348/410, 192, 180; 375/240.24; 704/230

(56) References Cited

U.S. PATENT DOCUMENTS

| | | | |
|---|---|---|---|
| 5,414,527 A | * 5/1995 | Koshi et al. | 358/433 |
| 5,861,922 A | * 1/1999 | Murashita et al. | 348/420 |
| 6,088,392 A | * 7/2000 | Rosenberg | 375/240 |
| 6,393,061 B1 | * 5/2002 | Owechko | 375/240.29 |
| 6,437,821 B1 | * 8/2002 | Janko et al. | 348/180 |

* cited by examiner

*Primary Examiner*—Anh Hong Do
(74) *Attorney, Agent, or Firm*—Francis I. Gray

(57) ABSTRACT

A method of determining the blockiness period in DCT-based codecs determines the blockiness period having the maximum measurement value for each image of an input video signal. The blockiness periods having the maximum measurement values for each image are accumulated in a histogram representing the number of images at each different blockiness period. The maximum peak of the histogram represents the blockiness period induced by DCT-based codecs.

6 Claims, 2 Drawing Sheets

BLOCKINESS PERIOD DETECTION OF DCT-BASED CODECS

BACKGROUND OF THE INVENTION

The present invention relates to video compression, and more particularly to accurately detecting a blockiness period induced by DCT-based codecs.

Companies that distribute video over compressed pathways, such as satellite or digital cable distributors, have hundreds of channels which they need to monitor for defects. Many companies choose to use equipment using single ended measurement algorithms, such as that described in U.S. patent application Ser. No. 09/152,495 entitled "Picture Quality Measurement Using Blockiness" and filed Sep. 10, 1998, for realtime measurements. However these single ended blockiness measurements do not decide whether the blockiness being detected is caused by unacceptable codec (COder/DECoder) deformation of the image, or whether the blockiness is the natural result of blockiness that exists within the image, most commonly introduced by lettered graphics imposed on the image.

This task is complicated by the fact that changes to the codec, or digital pathway, may change the periodicity on the fly. A video stream also may be subject to more than one codec before the end viewer sees it, and so may have more than one periodicity in the picture.

Therefore what is desired is an accurate blockiness period detection algorithm for DCT-based codecs to decide whether blockiness that exceeds specified thresholds is caused by the codecs or natural events in the image.

BRIEF SUMMARY OF THE INVENTION

Accordingly the present invention provides an accurate blockiness period detection of DCT-based codecs using a histogram-based technique. Each image in an input video signal is processed to determine a blockiness period having a maximum correlation value. The blockiness period so identified is accumulated in a histogram. The maximum peak in the histogram corresponds to the blockiness period induced by the DCT-based codecs. Identified blockiness periods from the image may be compared with those of immediately preceding images from the video signal so that only if there is essentially equivalence is the histogram incremented for that blockiness period. Likewise if a blockiness period does not have a maximum for a given number of images or time intervals, that period is deleted from the histogram. Further if one of the peaks exceeds the peak associated with the codec blockiness period by a specified factor, then the codec blockiness period is deemed to have changed and is then associated with the new maximum peak.

The objects, advantages and other novel features of the present invention are apparent from the following detailed description when read in conjunction with the appended claims and attached drawing.

DETAILED DESCRIPTION OF THE INVENTION

Figure 1:
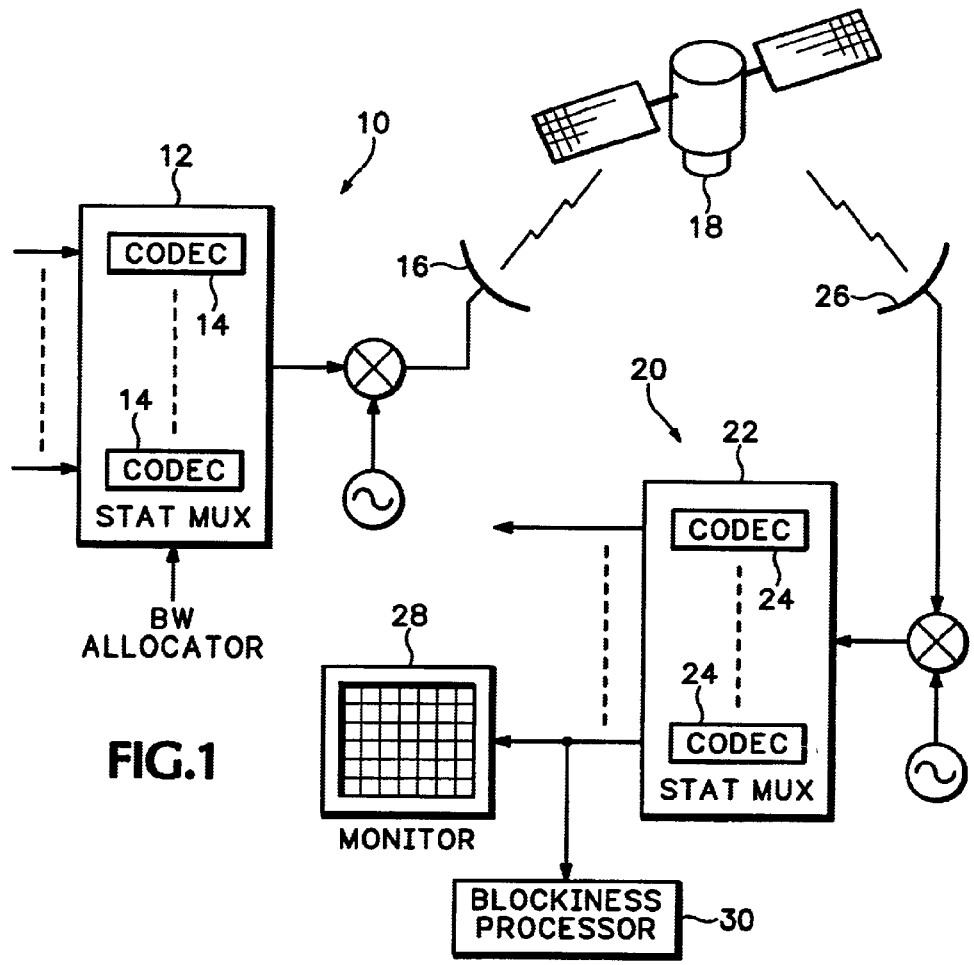
FIG. 1 is a block diagram of a television satellite system.
Figure 2:
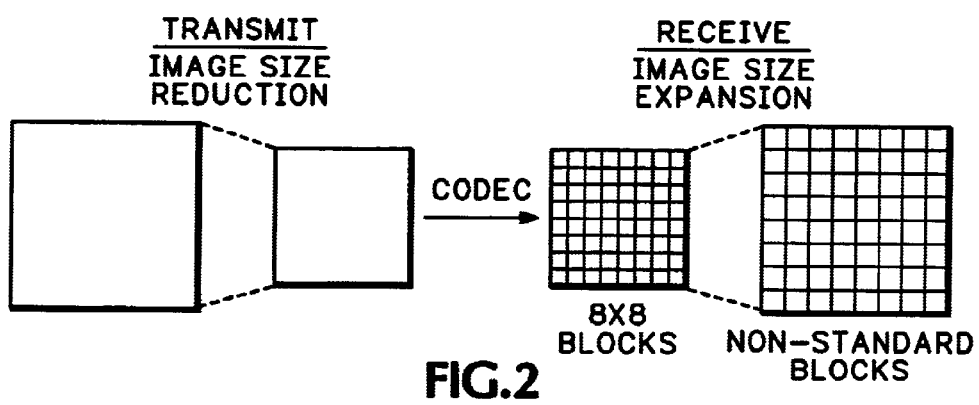
FIG. 2 is an illustrative view of picture size reduction that occurs prior to the codec at the transmit site with corresponding expansion at the receive site.

Referring now to FIG. 1 in a typical use video signals from many sources are input to a stat mux 12 at a transmit site 10. Also input to the stat mux 12 is a bandwidth allocator control that allocates the bit rate for compression to each channel as a function of the activity on that channel. The stat mux 12 includes codecs 14 controlled by the bandwidth allocator control. The compressed video signals from the codecs 14 are combined onto a carrier signal and transmitted via a transmit antenna 16 to a satellite 18. The encoded signal is "bounced" off the satellite 18 and received at a receive antenna 26 at a receive site 20. The received video signal is separated into individual channels by a receive stat mux 22 which includes codecs 24, one for each channel. The resulting video signals are displayed on individual monitors 28. Each image displayed has a certain amount of blockiness attributable to the codecs 14, 24 which is normally invisible to an observer, but is detectable. The video signals also may be reduced as shown in FIG. 2 before being encoded, and then expanded after being decoded since the full size image is larger than the normal display area of a monitor. The codec introduces, for example, an 8×8 pixel blockiness, but the expansion after decoding may result in non-standard block sizes. Each decoded video channel may be processed by a blockiness processor 30 using an algorithm as described below.

Figure 3:
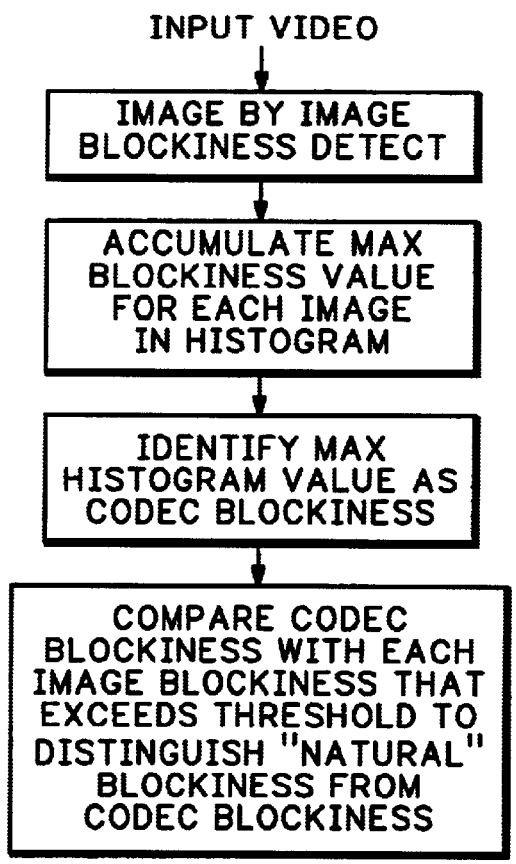
FIG. 3 is a flow chart view of the algorithm for deciding whether picture blockiness is the result of a codec or other phenomena according to the present invention.

The blockiness algorithm of the current invention, as shown in FIG. 3, determines the periodicity of the normally invisible "background" blockiness that the codecs produce and uses that blockiness measure to determine whether other perceived blockiness is due to the codecs or to other "natural" sources, such as letter graphics. For each field or image of the video signal two blockiness values are calculated, such as described in co-pending U.S. patent application Ser. No. 09/152,495 entitled "Picture Quality Measurement Using Blockiness" filed Sep. 10, 1998. The two blockiness values are the blockiness of a "current" period, the assumed codec imposed period, and a period that returns a maximum blockiness. The maximum blockiness measure may be compared against the "maximum" period found in one or more fields immediately preceding and, if the periods are identical within a given epsilon, the maximum blockiness measure is entered into a histogram of field periodicities maintained by the blockiness processor. Epsilon is a very small value used to account for slight processing-related discrepancies between images that are not related to blockiness. For example a blockiness period of 13.1010482 may be determined for one image, and the blockiness period for the next image may be 13.1010512. Both of these values are treated as the same blockiness period since the difference is less than epsilon, assuming an epsilon value of 0.0001. This pre-processing prior to incrementing the histogram is used for memory conservation.

If a "maximum" periodicity peak in the histogram exceeds a "current" periodicity peak by a given factor, such as two, the "current" periodicity for the codecs is assumed to have changed and is replaced by the "maximum" periodicity. Each histogram entry of detected periods also contains a counter since this periodicity last was seen. Periodicities that are not updated within a specified length of time, typically two minutes, are automatically deleted from the system except for the "current" periodicity. If one of the other peaks reaches a maximum limit value, the protection of the "current" periodicity is removed and it also is subject to being deleted if not updated within the specified length of time. This further serves to conserve memory as well as allow relatively rapid recognition of codec periodicity changes.

For each "maximum" periodicity, if the measured value exceeds a given threshold indicating "visible" blockiness, the periodicity may be compared to the codec periodicity from the histogram to determine if the "visible" blockiness results from the codecs or natural events in the image.

Figure 4:
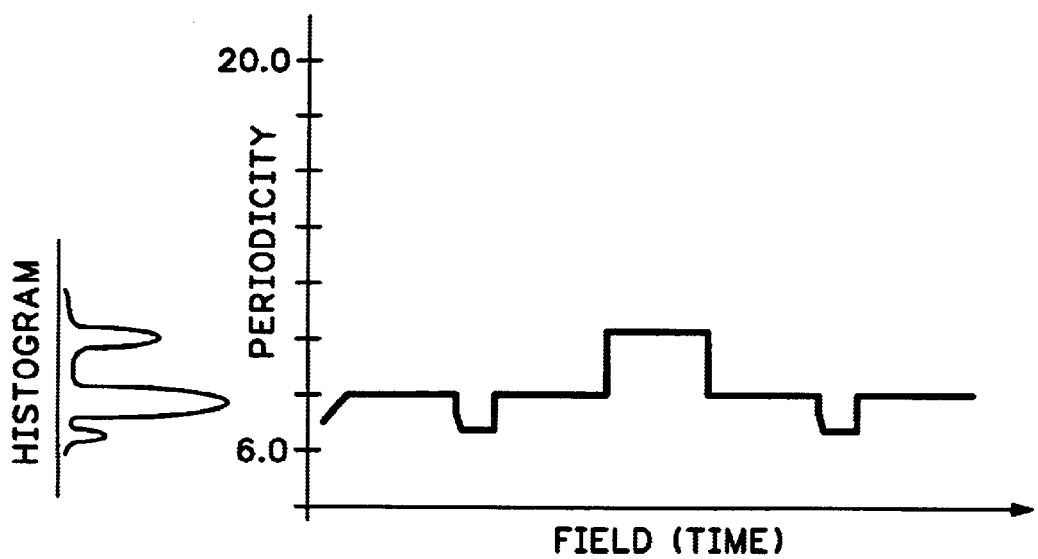
FIG. 4 is a graphic view of periodicity versus time with an associated histogram according to the present invention.

FIG. 4 illustrates a field periodicity versus field (time) processed graph and associated histogram. As can be seen for this example there are maximum values for respective fields that correspond to periodicities of 6, 8 and 10. The corresponding histogram has a maximum peak at the periodicity value of 8, which is assumed to be the periodicity of the codecs. The other peaks of the histogram are deemed to be from a source other than the codecs, such as graphic lettering or other regular features of the images during those fields. If the histogram has a peak at another periodicity, such as 10, that exceeds the current maximum peak at 8 by a specified ratio, such as two, the codecs are presumed to have changed to a periodicity of 10. Likewise if no other maximums with periodicity of 6 are detected after a specified time, such as two minutes, the values at periodicity 6 are deleted from the histogram. If the codec periodicity is changed, the timeout after the specified time accentuates that change.

Thus the present invention provides a method of detecting the blockiness period in DCT-based codecs by building a histogram of periods having the maximum measured value over multiple fields, the period having the maximum peak in the histogram being the blockiness period induced by the DCT-based codec.

What is claimed is:

1. A method of determining a codec blockiness period comprising the steps of:

determining for each image in an input video signal a blockiness period having a maximum value;

building a histogram representing the number of images for each blockiness period from the determining step; and identifying the codec blockiness period as that blockiness period corresponding to a maximum peak in the histogram.

2. The method as recited in claim 1 farther comprising the steps of:

comparing the blockiness period from the determining step with the blockiness periods from N immediately preceding images; and incrementing the histogram for the blockiness period when it is the same within a given epsilon for the N immediately preceding images.

3. The method as recited in claim 1 further comprising the steps of:

checking each blockiness period over a specified time interval to determine whether any new ones have been added to the histogram; and deleting the blockiness period from the histogram when no new ones have been added to the histogram during the specified time interval.

4. The method as recited in claim 3 further comprising the step of protecting the maximum peak from the checking and deleting steps until another peak in the histogram reaches a specified maximum limit.

5. The method as recited in claim 1 further comprising the steps of:

comparing the peaks from the histogram with the peak for the codec blockiness period; and when one of the peaks becomes greater than the peak for the codec blockiness period by a specified factor, changing the codec blockiness period to that corresponding to such greater peak.

6. The method as recited in claim 1 further comprising the steps of:

limiting the maximum peak to a specified maximum limit value;

checking each blockiness period except that represented by the maximum peak over a specified time interval to determine whether any new ones have been added to the histogram;

deleting the blockiness period from the histogram when no new ones have been added to the histogram during the specified time interval;

subjecting the blockiness period represented by the maximum peak to the checking and deleting steps if another peak in the histogram reaches the specified maximum limit value; and when one of the peaks becomes greater than the maximum peak for the codec blockiness period by a specified factor, changing the codec blockiness period to that corresponding to such greater peak.

* * * * *